(No Model.) 2 Sheets—Sheet 2.
W. N. WHITELEY.
HAY TEDDER.
No. 530,147. Patented Dec. 4, 1894.
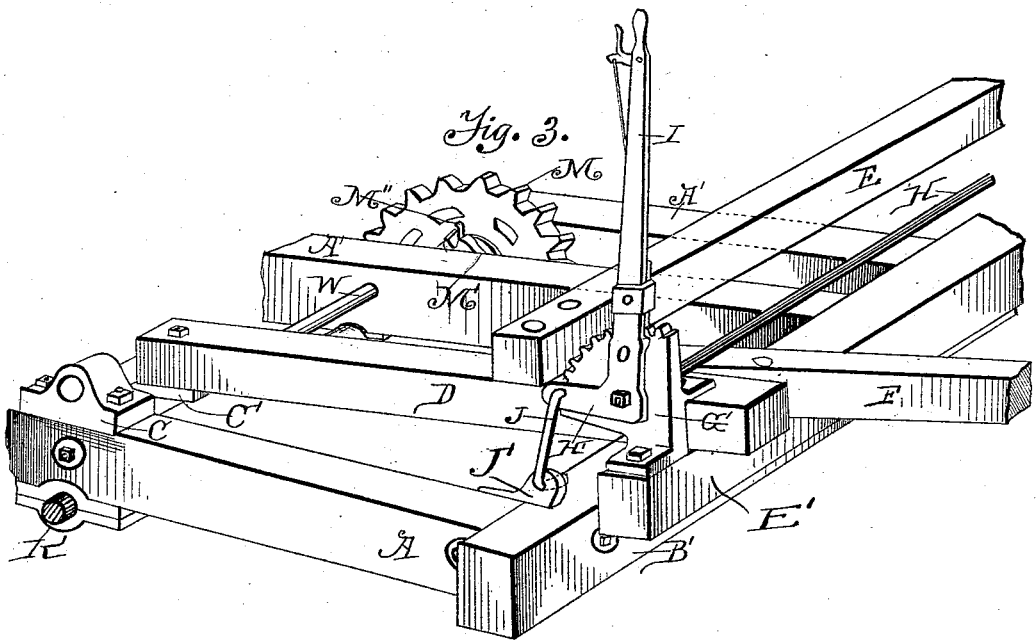
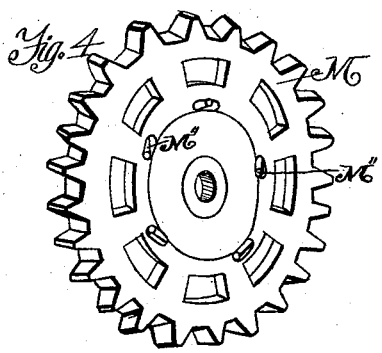
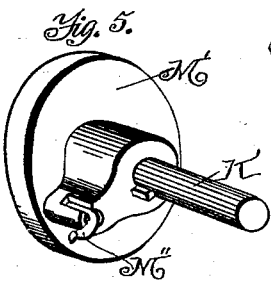
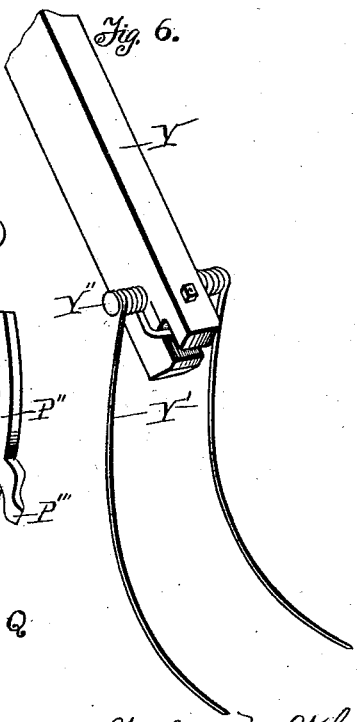
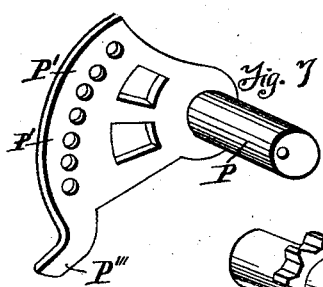
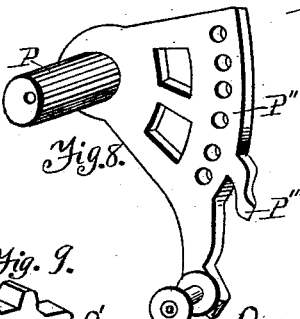
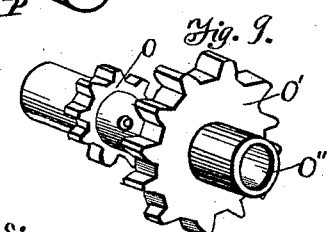
Witnesses:
W. A. Richison
L. Schaeffer
William N. Whiteley
Inventor
By Chas. E. Adamson
Atty.

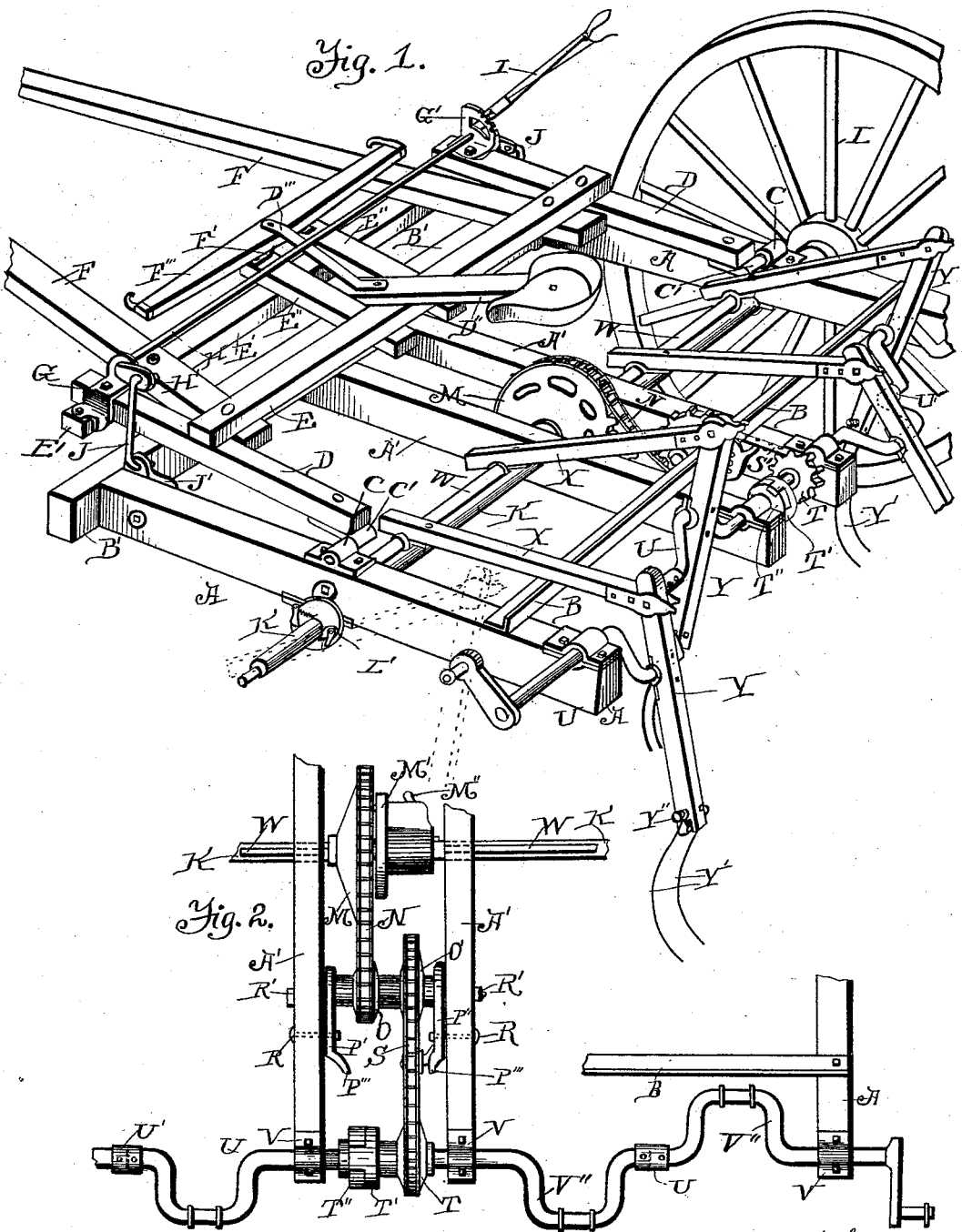

UNITED STATES PATENT OFFICE.

WILLIAM N. WHITELEY, OF MUNCIE, INDIANA, ASSIGNOR TO CHARLES A. KITTS, OF SAME PLACE.

HAY-TEDDER.

SPECIFICATION forming part of Letters Patent No. 530,147, dated December 4, 1894.

Application filed March 26, 1894. Serial No. 505,101. (No model.)

*To all whom it may concern:*

Be it known that I, WILLIAM N. WHITELEY, a citizen of the United States, residing at Muncie, in the county of Delaware and State of Indiana, have invented certain new and useful Improvements in Hay-Tedders; and I do hereby declare the following to be a full, clear, and exact description of the invention, such as will enable others skilled in the art to which it appertains to make and use the same.

My invention relates to improvements in hay tedders, and the objects of my invention are to construct a cheap, simple and durable tedder, and one that will be easily managed. I attain these objects by the mechanism illustrated by the accompanying drawings, in which—

Figure 1 is a perspective view of my tedder with one wheel removed, showing most all the working parts. Fig. 2 is a top plan view of the rear end of the center part of the frame, showing a part of the crank shaft and the driving chain gear. Fig. 3 is a perspective view of one forward corner of the frame, showing particularly the lever and mechanism for tilting the frame. Fig. 4 is a perspective view of the main sprocket wheel. Fig. 5 is a view of the clutch wheel which runs directly at the side of the main wheel and is rigidly secured to the main shaft. Fig. 6 is a perspective view of the lower end of a fork arm, showing the manner of securing the fork thereto. Figs. 7 and 8 are perspective views of the eccentric intermediate gear shafts, and Fig. 9 is a perspective view of the intermediate gear wheels on their collars.

Similar letters refer to similar parts throughout the several views.

The main frame consists of side bars A A and two inner bars A' A'. These bars are strengthened crosswise near their rear ends by the L-bar B, and the front bar B', all as shown in Fig. 1. A pivoted frame carrying the driver's seat and propelling shafts, &c., is secured to the side bars A by pivoted connecting castings C C', the castings C' C' being secured to the rear end of the end bars D D. These end bars D extend up to and above the forward end of the main frame, at which place the cross bars E E' are secured to them; bar E being secured on the upper side of the bars D D, and the bar E' to the under side and front ends of the said bars D, all as shown in Fig. 1.

At each side of the frame the shafts F F are bolted, being placed between the bars D D and between the bars E and E'. Near the center of the said frame two parallel bars E" E" are bolted, and between these bars the seat rest D" is secured on an incline, and to the forward end of the bars E" is secured a V-shaped iron F' on which the singletree F''' is pivoted by a bolt through the brace D'''.

To the outer forward corners of the pivoted frame are secured the castings G G' through which the iron shaft H is journaled. One end of the said shaft is provided with a short arm H' which is keyed to it, the other end having the lever I secured to the shaft in a similar manner. The lower part of the said lever is also provided with a short arm, and to the said arms one end of the links J J are connected, the said links extending down and connecting in a similar manner to the eyelets J' J', all as shown in Figs. 1 and 3. These castings G G' and eyelets J' serve to strengthen the frames and by adjustment of the lever I, the link J will cause the rear end of the main frame to tilt or rise up and down in throwing the tedder forks onto or away from the ground.

The main shaft K is journaled crosswise of the main frame in boxings to the under side and near the center of the said frame. This shaft extends through the wheels L far enough to admit of a tedder arm being connected to each end of the said shaft, all as shown and indicated in Figs. 1 and 2. The shaft K is provided with clutches L' in the ordinary style, against which the wheels L work so as to turn the said shaft with the wheels when one or both are moving in a forward direction. Near the center of the main shaft, and between the bars A A' is secured the driving wheel M M'. The part M is journaled loosely on the shaft K and provided with sprocket teeth on its face and notches M" on its inner side, most clearly shown in Fig. 4. Against the notched side of said wheel the clutch disk M' is fitted, working closely together, the said disk being keyed to the shaft K so that it must at all times revolve with the said shaft. The disk is provided with a spring bolt M''' which works in a slot and hole in the said disk so that it can be set into the said disk and slot and extending through the said disk into one of the holes or notches M'' in the wheel M. When the bolt is thus set as shown in Figs. 2 and 3, the wheel M must turn with the disk and shaft in a forward movement. By drawing the bolt M'' back and catching it over the rim, as shown in Fig. 5, the bolt is held in position by a coil spring around the bolt with the said slot, and the disk and wheel are thus separated so that the wheel M will not revolve, thereby causing the tedder forks to stand at rest, or in other words be "out of gear." A driving chain N is run from the main wheel to the small intermediate wheel O. The wheel O is secured to a large chain wheel O' by a hollow shaft or collar O'', or they are preferably all cast in one piece, most clearly shown in Fig. 9. The collar or hollow shaft O'' is placed on a sectional eccentric shaft P P. This shaft is made in two parts, each having an adjusting flange plate P' P'', each of which is provided with holes for securing the plate at various angles with the shaft P. Each of these plates has a short projection P''' which is taken hold of in moving the plate from one position to another. The plate P'' is also provided with a small slack wheel Q, which is journaled loosely to an arm on the lower side of the said plate. Under and against this wheel the lower strand of the chain R works, the said wheel serving to press down on the said chain in taking up its slack, all as shown in Figs. 2, 7 and 8. When the plates are set with the bolts R R in the lower holes P' P'', then the wheels O O' are thrown as near to the main wheel M as they will go. By removing the bolts and pressing down on the ends P''' the eccentric shaft P P will throw the sleeve upward and rearward, causing the chain N to tighten and the chain S to loosen.

The slack wheel Q will take up the looseness in the chain S, causing each chain to become tightened by the adjusting of the plate as described. The chain S works around the wheel T which is rigidly secured to the crank shaft, as shown in Figs. 1 and 2. This wheel also contains one half of the disk coupling T', the other half T'' being secured to the adjoining section of the sectional crank shaft U, all as shown in Figs. 1 and 2. The crank shaft U is made in four sections. The two outer sections are secured to the two inner sections by the coupling U', and the two inner sections are secured together by the disk coupling T' T'', most clearly shown in Figs. 1 and 2. The crank shaft U is journaled in the boxing V in the rear ends of the frame, and the cranks V'' set so that they will stand at different angles in order that some of the forks may be moving up or forward while others are moving downward and backward as indicated in Fig. 1.

Between the bars A A', and at each side of the main wheel M extends a rod W just above and parallel with the main shaft K. These rods do not extend through the main wheel but their inner ends are secured in the bars A' A', and their outer ends into the bars A A, all as shown in Figs. 1 and 2. On each of these bars, two of the fork arms X X are secured by boxings as shown in Fig. 1. The other ends of these arms are pivoted to the upper ends of the fork handles Y. Just below these connections the fork handles are journaled to the shaft cranks in the usual manner, as fully shown in Fig. 1. The upper parts of the forks Y' are wound around a pin Y'' and secured in a slot in the lower end of the said fork handles, all as fully shown in Figs. 1 and 6.

Having thus described my invention, I claim the following, and desire to secure the same by Letters Patent:

A hay tedder of the class described consisting of a main frame carrying a sectional crank shaft and a jointed and hinged sub frame, carrying a seat and the tilting mechanism, the driving gear located centrally in the main frame and consisting of wheel M mounted loosely on the main shaft, a clutch disk rigidly secured to the said shaft, intermediate chain wheels O O' mounted on a sectional eccentric shaft P P, the said shaft having adjustable side plates one of which is provided with a clutch wheel Q, and the plates and shaft secured between the plates A' A' by bolts R R', a chain-driving wheel M and O, and a chain-driving wheel O' and T, all constructed and arranged as and for the purpose set forth.

WILLIAM N. WHITELEY.

Witnesses:
    EDWARD R. TEMPLER,
    AMOS WHITELEY.